US012659442B1

(12) United States Patent
Jeong et al.

(10) Patent No.: US 12,659,442 B1
(45) Date of Patent: Jun. 16, 2026

(54) STEREO DEPTH ADAPTATION WITH VIEWPOINT VIRTUALIZATION

(71) Applicant: QUALCOMM Incorporated, San Diego, CA (US)

(72) Inventors: Jisoo Jeong, San Diego, CA (US); Jamie Menjay Lin, San Diego, CA (US); Hong Cai, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/171,013

(22) Filed: Apr. 4, 2025

(51) Int. Cl.
| | |
|---|---|
| *H04N 13/111* | (2018.01) |
| *G06T 7/593* | (2017.01) |
| *H04N 13/00* | (2018.01) |
| *H04N 13/239* | (2018.01) |

(52) U.S. Cl.
CPC ............ *H04N 13/111* (2018.05); *G06T 7/593* (2017.01); *G06T 2207/20081* (2013.01); *G06T 2207/20084* (2013.01); *H04N 2013/0081* (2013.01); *H04N 13/239* (2018.05)

(58) Field of Classification Search
None
See application file for complete search history.

(56) References Cited

U.S. PATENT DOCUMENTS

| | | | | |
|---|---|---|---|---|
| 12,340,459 | B2 * | 6/2025 | Viehauser | ............ G06V 10/247 |
| 2019/0122378 | A1 * | 4/2019 | Aswin | ................. G06V 20/647 |
| 2023/0334717 | A1 * | 10/2023 | Guizilini | ................. G06T 9/002 |

FOREIGN PATENT DOCUMENTS

| | | | | | |
|---|---|---|---|---|---|
| WO | WO-2018046964 | A1 * | 3/2018 | ............. | G06V 10/82 |
| WO | WO-2025240082 | A1 * | 11/2025 | .......... | G06T 15/205 |
| WO | WO-2025252900 | A1 * | 12/2025 | .......... | G06V 10/764 |

* cited by examiner

*Primary Examiner* — Tyler W. Sullivan
(74) *Attorney, Agent, or Firm* — Polsinelli LLP

(57) ABSTRACT

Systems and techniques are described herein for image processing. For example, a computing device can process, using a first machine learning network, a first image of a scene from a first viewpoint and a second image of the scene from a second viewpoint to generate a predicted image of the scene from a predetermined viewpoint and a first disparity map associated with differences between the predicted image and the second image; process, using a second machine learning network, the predicted image and the second image including added noise to generate a second disparity map, wherein the second disparity map is associated with differences between the second image with added noise and the predicted image; determine a loss associated with a comparison of the first disparity map and the second disparity map; and adjust parameters of the first machine learning network based on the loss.

20 Claims, 9 Drawing Sheets

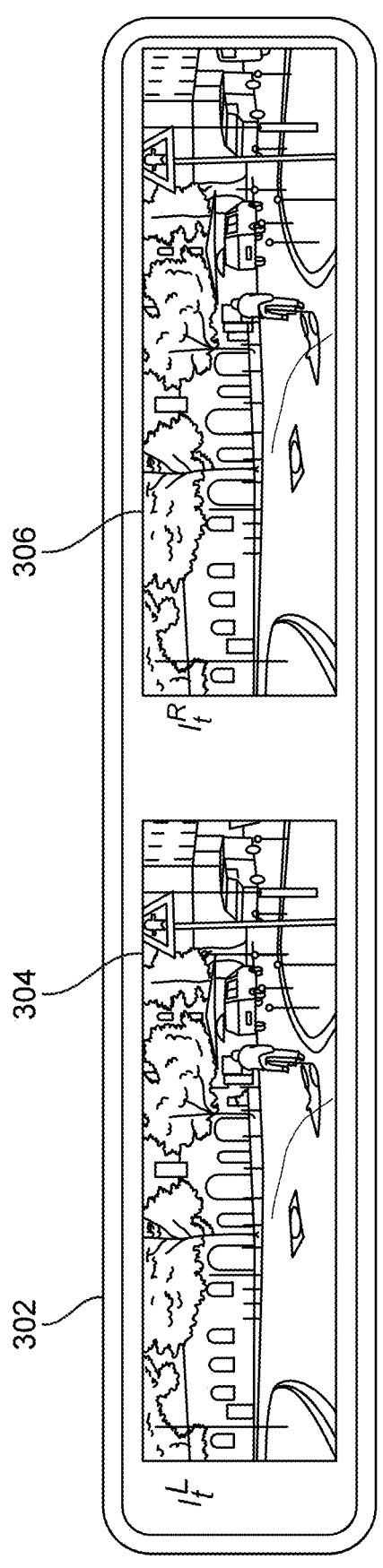
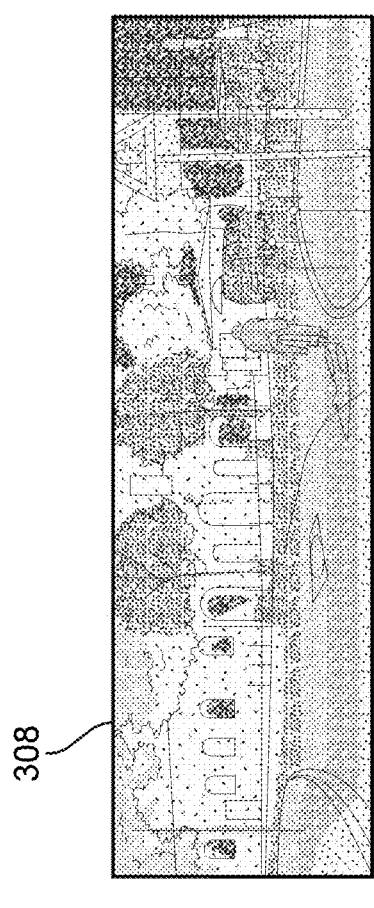
FIG. 3

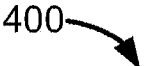
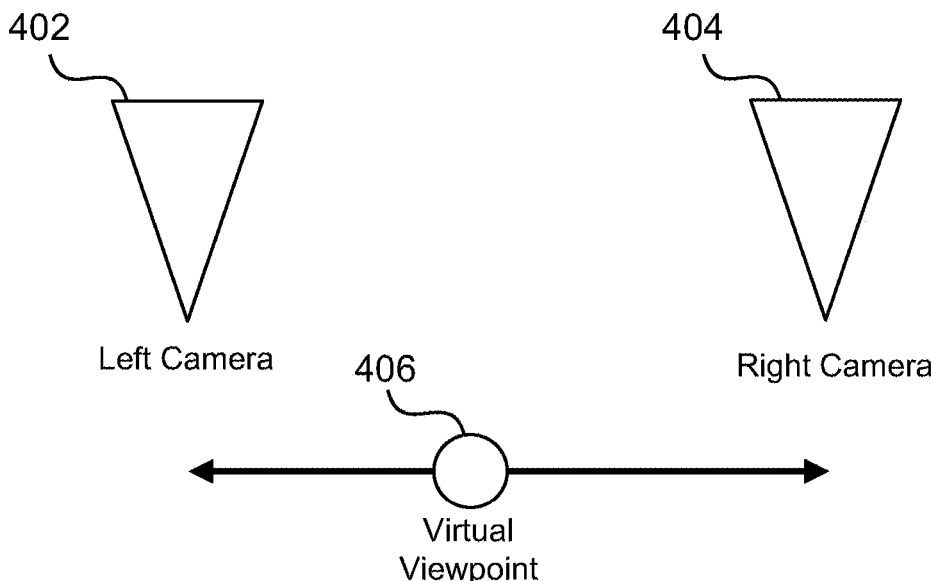
FIG. 4

600

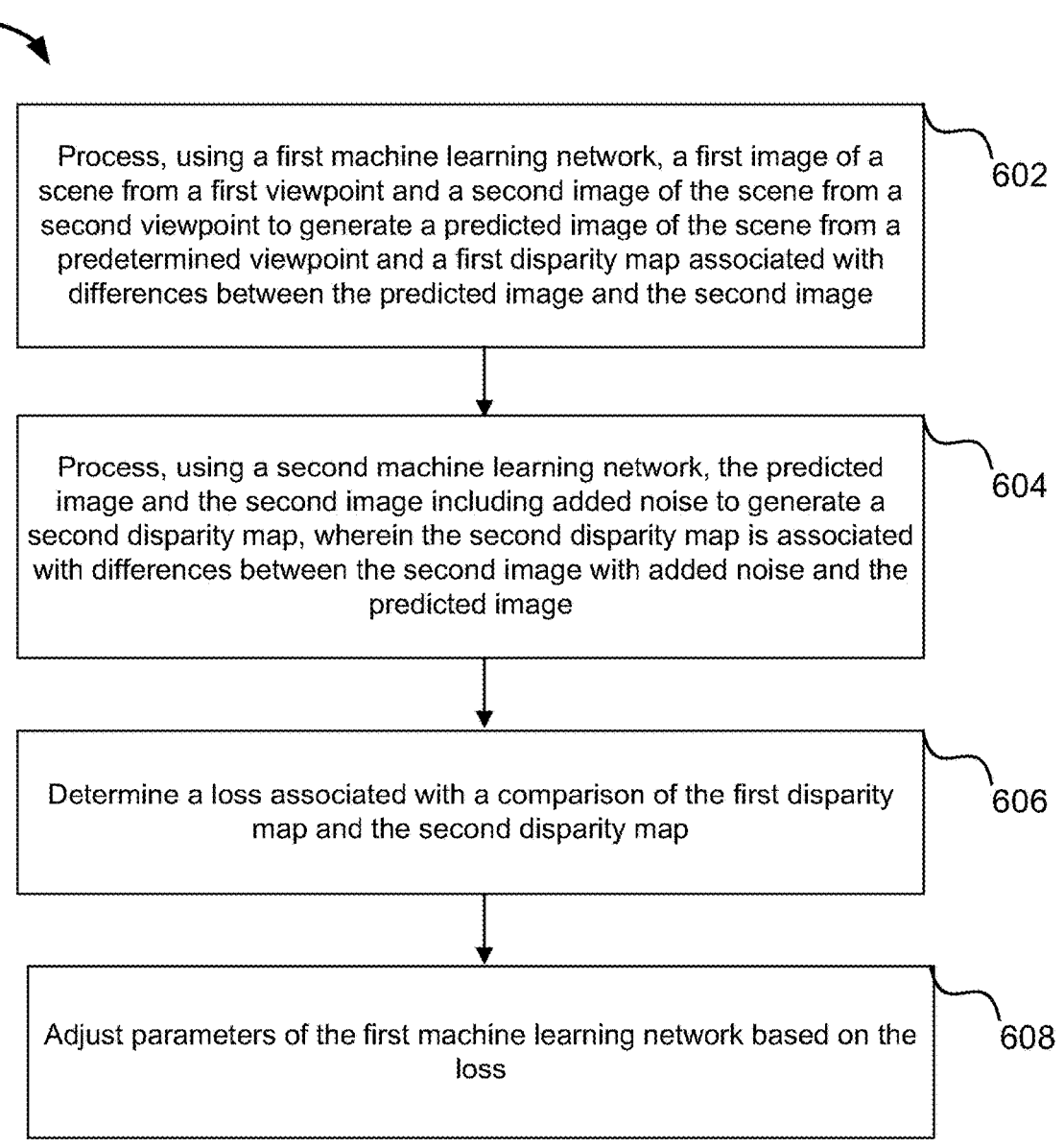

Process, using a first machine learning network, a first image of a scene from a first viewpoint and a second image of the scene from a second viewpoint to generate a predicted image of the scene from a predetermined viewpoint and a first disparity map associated with differences between the predicted image and the second image

602

Process, using a second machine learning network, the predicted image and the second image including added noise to generate a second disparity map, wherein the second disparity map is associated with differences between the second image with added noise and the predicted image

604

Determine a loss associated with a comparison of the first disparity map and the second disparity map

606

Adjust parameters of the first machine learning network based on the loss

STEREO DEPTH ADAPTATION WITH VIEWPOINT VIRTUALIZATION

FIELD

The present disclosure generally relates to image processing for stereo depth and disparity estimation. For example, aspects of the present disclosure relate to systems and techniques for stereo depth adaptation with viewpoint virtualization.

BACKGROUND

Many systems and devices, such as autonomous and semi-autonomous vehicles, drones, mobile robots, mobile devices, extended reality (XR) devices, and other suitable systems or devices, use multiple sensors to gather data representing an environment include multiple sensors as well as processing systems to process the data, such as for route planning, navigation, collision avoidance, environment modelling/rendering, etc. One example of such a system can be stereo vision for systems and devices. In such a system, images can be generated using multiple cameras and processed to identify features in an environment, such as to estimate distances of objects represented in the images. Stereo vision techniques generally use information regarding the distance and placement of image sensors generating the images to estimate distances and depth.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In some aspects, an apparatus for image processing is provided. The apparatus includes at least one memory and at least one processor coupled to the at least one memory and configured to: process, using a first machine learning network, a first image of a scene from a first viewpoint and a second image of the scene from a second viewpoint to generate a predicted image of the scene from a predetermined viewpoint and a first disparity map associated with differences between the predicted image and the second image; process, using a second machine learning network, the predicted image and the second image including added noise to generate a second disparity map, wherein the second disparity map is associated with differences between the second image with added noise and the predicted image; determine a loss associated with a comparison of the first disparity map and the second disparity map; and adjust parameters of the first machine learning network based on the loss.

In some aspects, a method for image processing is provided. The method includes: processing, using a first machine learning network, a first image of a scene from a first viewpoint and a second image of the scene from a second viewpoint to generate a predicted image of the scene from a predetermined viewpoint and a first disparity map associated with differences between the predicted image and the second image; processing, using a second machine learning network, the predicted image and the second image including added noise to generate a second disparity map, wherein the second disparity map is associated with differences between the second image with added noise and the predicted image; determining a loss associated with a comparison of the first disparity map and the second disparity map; and adjusting parameters of the first machine learning network based on the loss.

In some aspects, a non-transitory computer-readable medium is provided having stored thereon instructions that, when executed by at least one processor, cause the at least one processor to: process, using a first machine learning network, a first image of a scene from a first viewpoint and a second image of the scene from a second viewpoint to generate a predicted image of the scene from a predetermined viewpoint and a first disparity map associated with differences between the predicted image and the second image; process, using a second machine learning network, the predicted image and the second image including added noise to generate a second disparity map, wherein the second disparity map is associated with differences between the second image with added noise and the predicted image; determine a loss associated with a comparison of the first disparity map and the second disparity map; and adjust parameters of the first machine learning network based on the loss.

In some aspects, an apparatus for image processing is provided. The apparatus includes: means for processing, using a first machine learning network, a first image of a scene from a first viewpoint and a second image of the scene from a second viewpoint to generate a predicted image of the scene from a predetermined viewpoint and a first disparity map associated with differences between the predicted image and the second image; means for processing, using a second machine learning network, the predicted image and the second image including added noise to generate a second disparity map, wherein the second disparity map is associated with differences between the second image with added noise and the predicted image; means for determining a loss associated with a comparison of the first disparity map and the second disparity map; and means for adjusting parameters of the first machine learning network based on the loss.

In some aspects, one or more of the apparatuses described herein is, is part of, and/or includes a mobile device (e.g., a mobile telephone or other mobile device), an extended reality (XR) device or system (e.g., a virtual reality (VR) device, an augmented reality (AR) device, or a mixed reality (MR) device), a wearable device, a wireless communication device, a camera, a personal computer, a laptop computer, a vehicle or a computing device or component of a vehicle, a server computer or server device (e.g., an edge or cloud-based server, a personal computer acting as a server device, another device, or a combination thereof. In some aspects, the apparatus(es) can include a camera or multiple cameras for capturing one or more images. In some aspects, the apparatus(es) can include a display for displaying one or more images, notifications, and/or other displayable data. In some aspects, the apparatus(es) can include one or more sensors (e.g., one or more global positioning system (GPS) sensors, one or more global navigation satellite system (GNSS) sensors, one or more inertial measurement units (IMUs), such as one or more gyroscopes, one or more gyrometers, one or more accelerometers, any combination thereof, and/or other sensor).

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The preceding, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIG. 3 is a block diagram illustrating an example stereo image pair and a disparity map, in accordance with some examples of the present disclosure;

FIG. 4 is a block diagram illustrating an example of image sensor positioning for stereo vision and a virtual viewpoint to generate predicted images, in accordance with some examples of the present disclosure;

FIG. 6 is a flow diagram for image processing, in accordance with aspects of the present disclosure;

DETAILED DESCRIPTION

Figure 1:
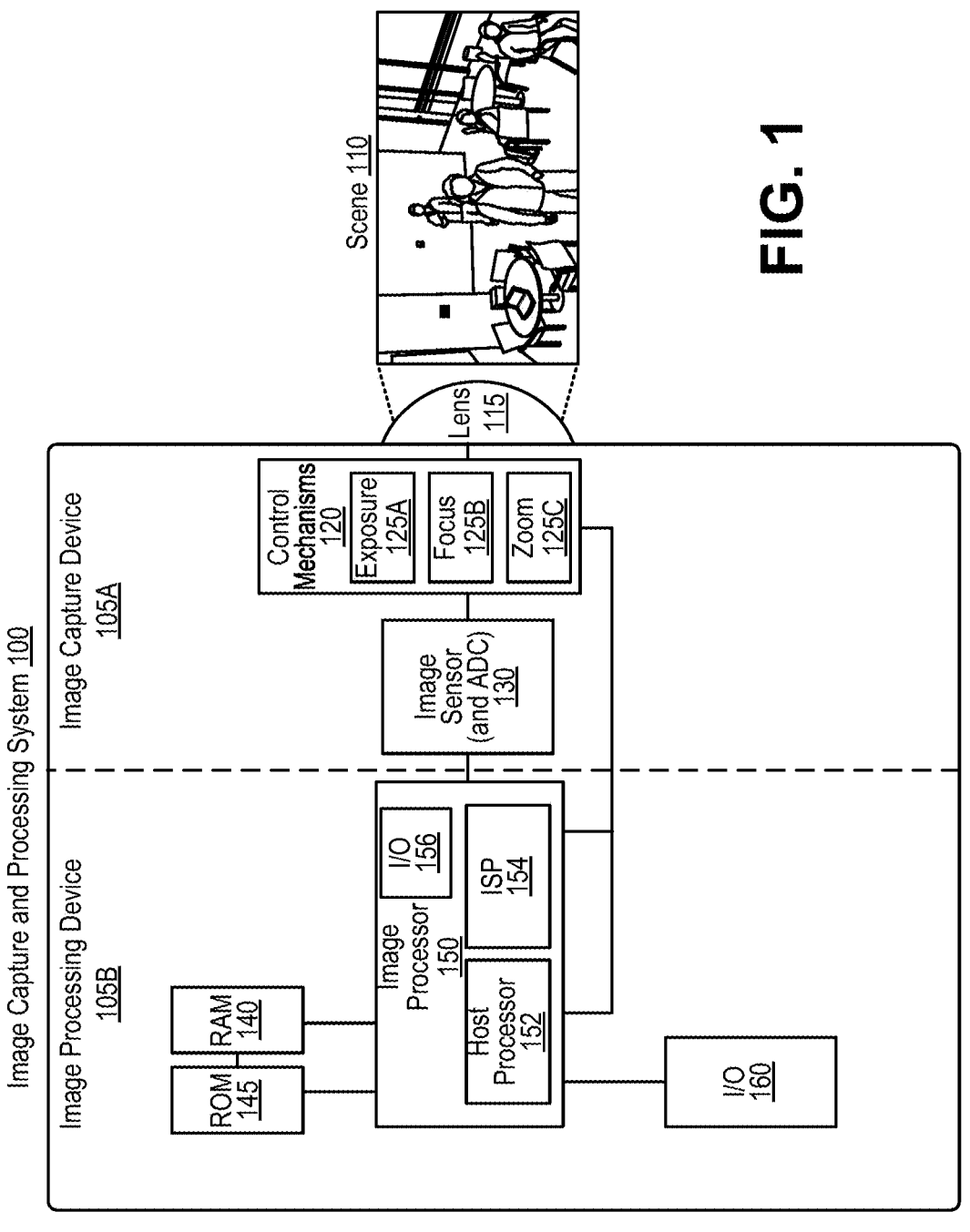
FIG. 1 illustrates an example image capture and processing system, in accordance with aspects of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

As mentioned, systems and devices such as autonomous vehicles, such as autonomous and semi-autonomous cars, drones, mobile robots, mobile devices, and other suitable systems or devices, use multiple sensors to gather data representing an environment include multiple sensors as well as processing systems to process the data, such as for route planning, navigation, collision avoidance, environment modelling/rendering, etc. One example of such a system can be stereo vision for systems and devices. In such a system, images can be generated using multiple cameras (or multiple image sensors of an apparatus or system) and processed to identify features in an environment, such as to estimate distances of objects represented in the images. Stereo vision techniques for estimating distances generally requires information regarding the distance and placement of sensors generating the images.

Stereo vision is an image processing technique by which depth of objects represented in two images generated from different locations (e.g., different viewpoints from two different image sensors or cameras). The differences between the positioning of features of images can be referred to as disparity. For example, disparity is the difference between the position of an image feature in a left image sensor and that of the corresponding image feature in the right image sensor at substantially the same time. In such examples, disparity can be used with a known distance between the image sensors generating the images to determine the depth of objects represented in the images. For example, depth can be determined based on $Z=(f \times B)/d$ where Z represents depth of an object represented in an image, f represents a focal length of the image sensor, B represents a distance between the two image sensors, and d represents disparity (e.g., a difference in pixel position of the object between images).

Depth information determined from stereo vision techniques can provide spatial measurements (e.g., positioning of objects in a three-dimensional (3D) space represented in an image) to generate 3D representations of a scene represented in stereo images (e.g., a pair of images or two or more images). For example, stereo vision techniques can be used to determine depth information associated with objects represented in stereo images to generate a point cloud representation of a scene which can be used to generate meshes or other 3D model representations of the scene. The 3D model representations can be used in various applications including virtual reality (VR), extended reality (XR), robotics, autonomous operation of vehicles, and other vision based tasks.

Current stereo vision techniques are generally dependent on known baseline distances between a first image sensor generating a first image of a stereo image pair (e.g., generating the first image from a first viewpoint) and a second image sensor generating a second image of the stereo image pair (e.g., generating the second image from a second viewpoint). Generally, machine learning networks performing stereo vision techniques are trained to perform depth estimation (or disparity map generation) using a stereo image pair where the baseline distance of the image sensors generating the stereo image pair is predetermined. Additionally, the baseline distances between image sensors for performing stereo vision techniques can vary. For example, an automobile such as a sedan performing stereo vision techniques for autonomous driving can use image sensors positioned at a shorter baseline distance than an automobile such as a truck. In further examples, a smartphone can include multiple image sensors at a shorter baseline distance than another smartphone or other electronic device.

A disparity map can refer to a representation of pixel-wise differences in location of pixel values of images from a stereo image pair (also referred to as pair of stereo images). The disparity map can include depth information based on a magnitude of the shift between pixel values represented in the stereo image pair (e.g., a distance at which the pixels are shifted represented as disparity values). In some examples, a smaller disparity value can indicate an object corresponding to the pixel values is closer than a larger disparity value. In some examples, the disparity can be determined based on matching features objects represented in the stereo image pair and a determined shift between the matching features from a first image of the stereo image pair to a second image of the stereo image pair. The disparity map can be an image representation of the disparity. In further examples, the disparity map can be a matrix representation of the disparity values.

Stereo depth adaptation can refer to image processing techniques of adjusting a stereo vision system (such as or including a machine learning network) for performing depth estimation across different domain variations (e.g., across extrinsic or intrinsic parameters including different lighting settings, different environments, different temperatures, different focal lengths of image sensors, different orientation of image sensors, different baseline distances between image sensors, etc.). Viewpoint virtualization can refer to image processing techniques of generating perspectives of a scene represented in one or more images by generating synthetic images from viewpoints not originally captured in the one or more images. Various techniques for viewpoint virtualization can include image warping and depth-based rendering.

The variability of baseline distances between image sensors for performing stereo vision techniques can introduce difficulties in training machine learning networks because machine learning networks for depth estimation using stereo vision are trained on data sets specific to the baseline distance. Additionally, at least because baseline distances can vary in length based on application (e.g., a baseline distance of an autonomous vehicle can be longer than a baseline distance of image sensors of a smartphone), generating training data sets specific to a baseline distance can be a resource intensive task.

Systems, apparatuses, electronic devices, methods (also referred to as processes), and computer-readable media (collectively referred to herein as "systems and techniques") are described herein for stereo depth adaptation with viewpoint virtualization. In some aspects, the systems and techniques can include a machine learning network (also referred to as a machine learning model or machine learning system) for image processing (e.g., to perform depth estimation). For example, the machine learning model can be a neural network, convolutional neural network (CNN), transformer-based model, etc. The machine learning network can be trained using unsupervised or semi-supervised training of the machine learning network. For example, the machine learning network can be generated using ground-truth data in a source domain (such as a baseline distance which the machine learning network is pretrained) and unlabeled data in a target domain (such as a desired baseline distance to train the machine learning network).

In some aspects, systems and techniques for training a machine learning network for depth estimation can include a first machine learning network representing a teacher machine learning network and a second machine learning network representing a student machine learning network. In such an example, the teacher machine learning network can be a pretrained machine learning network trained on a training data set of source domain ground truth data. For example, the teacher machine learning network can be pretrained on images associated with a baseline distance (or other intrinsic parameters associated with the image sensors generating stereo image pairs) of a device. For example, the teacher machine learning network can be pretrained to generate a disparity map associated with a comparison of differences between images of the stereo image pair (e.g., differences or shifts in pixel values between a first image at a first viewpoint of the stereo image pair and a second image at a second viewpoint of the stereo image pair).

In some aspects, systems and techniques can include processing a stereo image pair (e.g., a first image of a scene from a first viewpoint and a second image of the scene from a second viewpoint). The output of the first machine learning network can include a disparity map representing differences between the first image and the second image. For example, the first image and the second image can be from different viewpoints. The disparity map can represent a shift in pixel values representing objects in the scene between the first image and the second image. In some examples, the disparity map can be represented as an image, such as a heat map image. In such an example, cooler colors (such as shades of blue) can represent further distances of objects and warmer colors (such as shades of red, orange, and yellow) can represent closer distances of objects. In further examples, the colors of the heat map image can be changed based on visualization color map settings. In such examples, various colors can represent further distance and closer distance of objects. In further examples, the disparity map can be represented as an array or matrix of disparity values. For example, the disparity values can correspond to pixels and can represent a shift between pixels corresponding to features of the images (e.g., an object represented in the stereo image pair). In such an example, the disparity value can increase based on the object being closer to the image sensors generating the stereo image pair.

In some aspects, the first machine learning network can generate a predicted image based on the disparity map. The predicted image can be an image generated from a predetermined viewpoint (e.g., an image generated in a target domain). For example, the first machine learning network (also referred to as the teacher machine learning network) can generate images with an adjusted baseline distance from the baseline distance of the image sensors generating the stereo image pair. For example, the first machine learning network can be pretrained on ground truth data associated with a source domain (e.g., the source domain can include the baseline distance, and other intrinsics or extrinsics, of the image sensors generating the stereo image pair). In some examples, the predetermined viewpoint is a viewpoint between the viewpoints of the stereo image pair (e.g., a viewpoint of the scene between a first viewpoint associated with the first image and a second viewpoint associated with the second image).

In some examples, the first machine learning network can generate a disparity map and provide the disparity map to a viewpoint virtualization engine. In some examples, the viewpoint virtualization engine can be a module, block, or component of the first machine learning network. In such an example, the viewpoint virtualization engine can perform various viewpoint virtualization techniques to generate the predicted image (e.g., to predict an image with a viewpoint associated with a target domain). In such an example, the viewpoint virtualization engine can perform viewpoint virtualization techniques such as depth rendering and image warping.

In one example, the viewpoint virtualization engine can perform image warping techniques such as occlusion and consistency aware interpolation (OCAI) to generate the predicted image from a virtual viewpoint between the viewpoints of the image sensors which generated the stereo image pair. For example, OCAI can account for occlusions occurring from a change in viewpoint when generating a predicted image (also referred to as a target image). The viewpoint virtualization engine can receive the disparity map from the first machine learning network. The viewpoint virtualization engine can generate two stereo depths ($d_{L \to R}$, $d_{R \to L}$) from the disparity map where $d_{L \to R}$ can represent depth estimations when warping the stereo image pair from the leftmost image sensor to the rightmost image sensor. In such an example, $d_{R \to L}$ can represent depth estimations when warping the stereo image pair from the rightmost image sensor to the leftmost image sensor.

In some examples, the first machine learning network generates disparity maps representing disparities unidirectionally (e.g., from comparing differences from one direction such as left to right, right to left, up to down, etc.). In such an example, the viewpoint virtualization engine (or in examples where the viewpoint virtualization engine is part of the first machine learning network, the first machine learning network) can apply a forward backward consistency-based occlusion mask (e.g., a mask representing the position of occlusions consistent when performing backward and/or forward warping of the stereo image pair). The viewpoint virtualization engine can fuse the images generated using forward warping and backward warping to generate the predicted image with a viewpoint in the target domain (e.g., from the viewpoint to which the first machine learning network is pretrained to generate).

In some examples, the output of the first machine learning network or the viewpoint virtualization engine can include a predicted image from a predetermined viewpoint (e.g., the viewpoint to which the first machine learning network is pretrained to generate) and a disparity map representing differences (e.g., shifts in disparity values) of the predicted image and the second image (or between the predicted image and the first image).

In some examples, the systems and techniques can include a second machine learning network (also referred to as the student machine learning network) to fine-tune parameters of the first machine learning network to adjust the viewpoint to which the first machine learning network can generate predicted images. For example, the second machine learning network can receive a second stereo image pair. In such an example, one of the images of the second stereo image pair can include the predicted image generated by the first machine learning network and the second image of the first stereo image pair (e.g., the stereo image pair processed using the first machine learning network to generate the predicted image) including added noise.

In some examples, the added noise to the second image can include another image added to portions of the second image. For example, the systems and techniques can include fusing an additional image with the second image to replace portions of the second image. For example, the added noise can include replacing pixel values of the second image with pixels values associated with an additional image. In other examples, the added noise can be random noise. For example, the added noise can be noise from a random Gaussian noise distribution added to the second image (or the first image).

The second machine learning network can process the predicted image and the second image with added noise (or the first image with added noise) to generate a second disparity map representing differences (e.g., shifts) in pixel values (or features of the predicted image and the second image with the added noise represented by the pixel values) between the predicted image and the second image with the added noise. The systems and techniques can include comparing the second disparity map and the first disparity map to determine a loss associated with the differences. For example, various loss functions can be used to determine the loss such as a mean squared error (MSE) loss or a Huber loss. In such an example, the first disparity map (e.g., the disparity map generated by the first machine learning network) can be used as (or can represent) a ground truth in determination of the loss (e.g., as a ground truth disparity map).

In some aspects, the systems and techniques can include adjusting parameters of the first machine learning network to reduce the loss function. In some examples, the systems and techniques can include using an exponential moving average (EMA) update to adjust the parameters of the first machine learning network. For example, the EMA update can be represented by the equation: $\theta_t' = \alpha \theta_{t-1}' + (1-\alpha)\theta_t'$, where $\theta_t'$ is a teacher machine learning network weight (e.g., weights of the first machine learning network), $\theta_t$ is student machine learning network weight (e.g., weights of the second machine learning network), and a is a smoothing coefficient hyperparameter (e.g., an adjustable weight indicating an amount of weight to be given to the teacher machine learning network weights and the student machine learning network weights in training).

In such an example, the adjustments to the parameters of the first machine learning network can be used to train (or fine-tune) the first machine learning network to generate predicted images from viewpoints with different baseline distance values of the images generating the stereo image pair. In some examples, the adjustments to the parameters of the first machine learning network can adjust subsequent outputs of the first machine learning network such that the first machine learning network outputs images from the viewpoints set by the viewpoint virtualization engine. In some examples, additional stereo images can be processed by the first machine learning network to train the first machine learning network to generate disparity maps associated with various different viewpoints (such as adjusting a previously updated viewpoint).

In such an example, when the first machine learning network has been trained or fine-tuned to generate disparity maps associated with the adjusted viewpoint of the first machine learning network. The systems and techniques can include using the first machine learning network to determine a depth of an object (e.g., a distance from the image sensors generating images) represented in the image. For example, the systems and techniques can include using the disparity map generated by the first machine learning network, and a baseline distance associated with the adjusted viewpoint to determine a distance of an object represented in images (e.g., a third image and a fourth image) generated by the image sensors.

Various aspects of the present disclosure will be described with respect to the figures.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses can be included in the image capture and processing system 100, such as one or more microlenses over each photodiode of the image sensor 130, which each bend the light received from the lens 115 toward the corresponding photodiode before the light reaches the photodiode. The focus setting can be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide-angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective covers that block light from reaching certain photodiodes, or portions of certain photodiodes, at certain times and/or from certain angles. In some cases, opaque and/or reflective covers may be used for phase detection autofocus (PDAF). In some cases, the opaque and/or reflective covers may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 9:
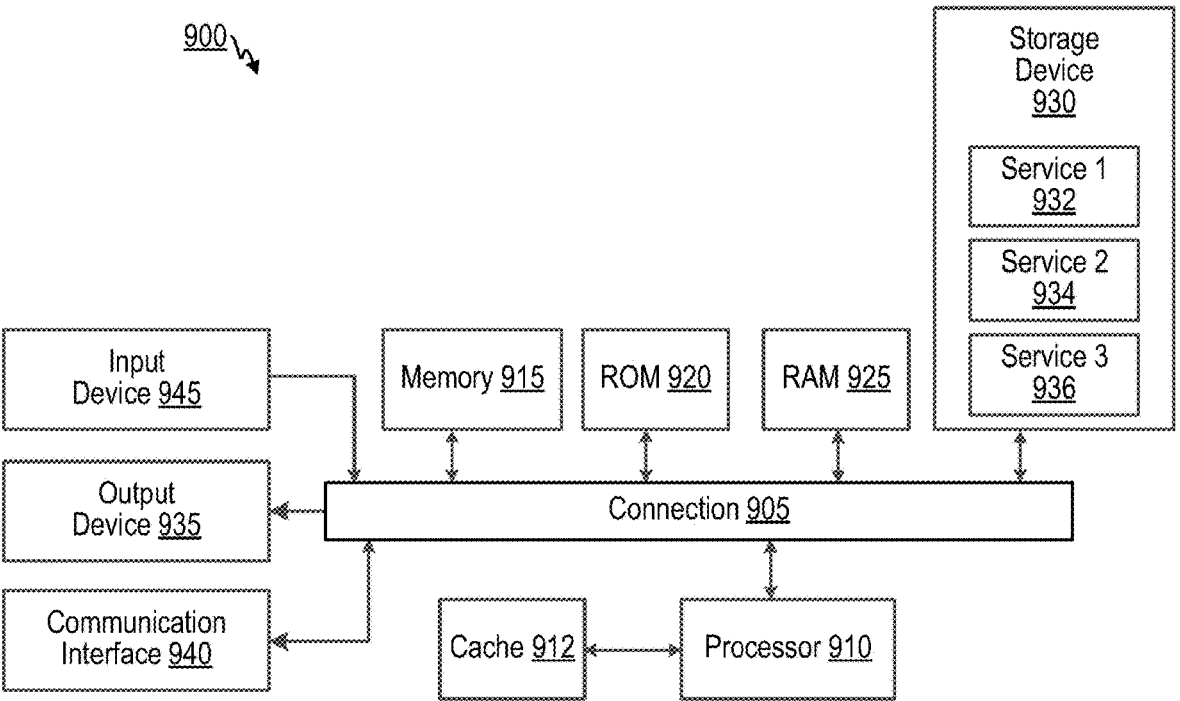
FIG. 9 illustrates an example computing device architecture of an example computing device which can implement the various techniques described herein.

The image processor 150 may include one or more processors, such as one or more image signal processors (ISPs) (including ISP 154), one or more host processors (including host processor 152), and/or one or more of any other type of processor 910 discussed with respect to the computing system 900 of FIG. 9. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI)

interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.10 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
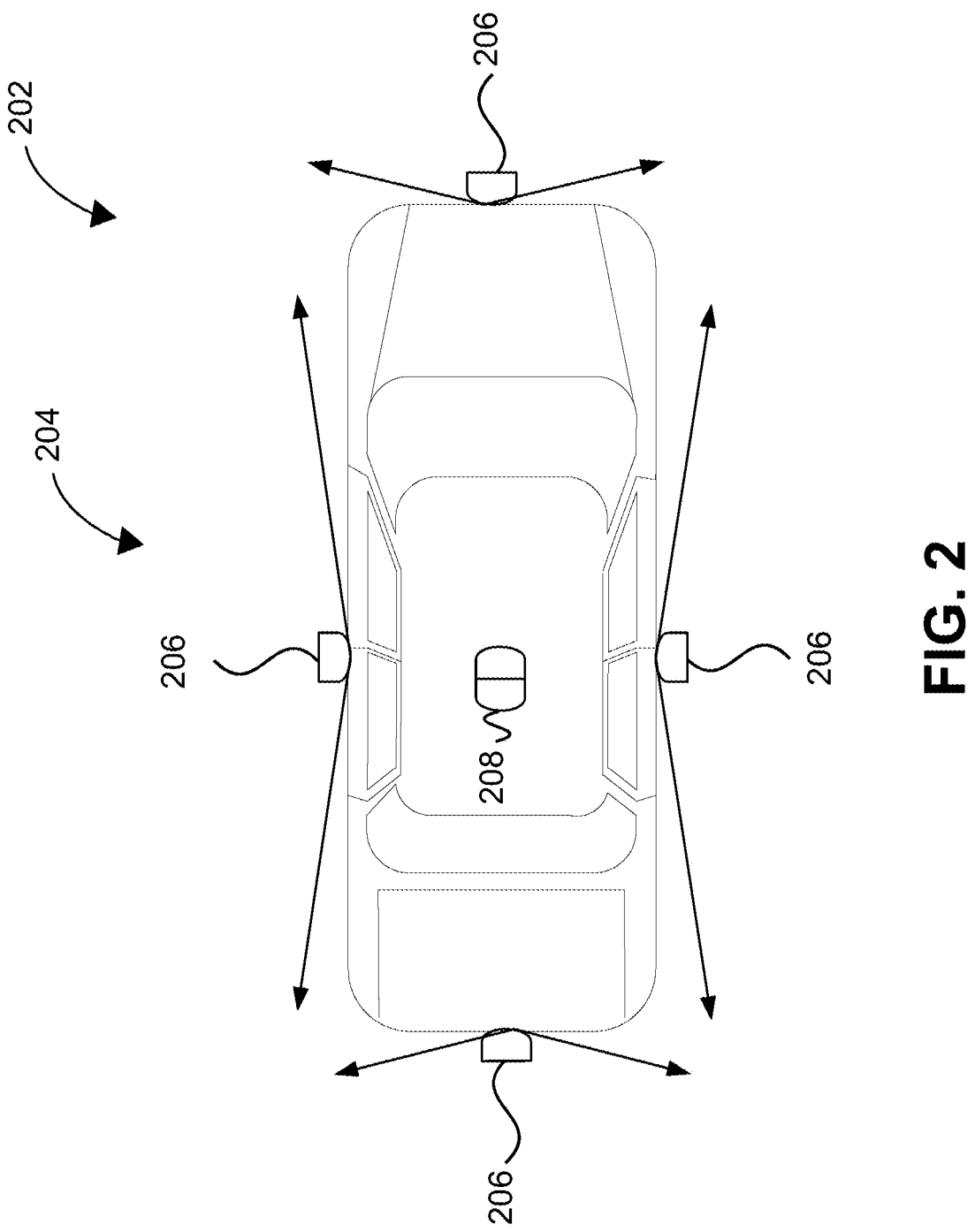
FIG. 2 is a diagram illustrating an example of a vehicle with a sensor suite, according to various aspects of the present disclosure.

FIG. 2 is a diagram illustrating an example of a vehicle (e.g., an autonomous vehicle) 202 with a sensor suite 204. The source sensor suite 204 is shown to include multiple cameras 206. In some examples, the source sensor suite 204 can include a Light Detection and Ranging (LIDAR) sensor 208 (e.g., in addition to the cameras 206). Each of the cameras 206 can be stereo camera pairs (e.g., a first camera and a second camera). In one or more examples, the source sensor suite 204 of the source vehicle 202 may include a greater or lower number of cameras 206, than as shown in FIG. 2.

Collectively, the source sensor suite 204 may have certain intrinsic parameters (e.g., focal lengths of the cameras 206, optical centers of the cameras 206, skew coefficients of the cameras 206, frame-capture rates of the cameras 206, and/or base distance between cameras of a stereo camera pair) and certain extrinsic parameters (e.g., positions of the cameras 206 on source vehicle 202).

Figure 5:
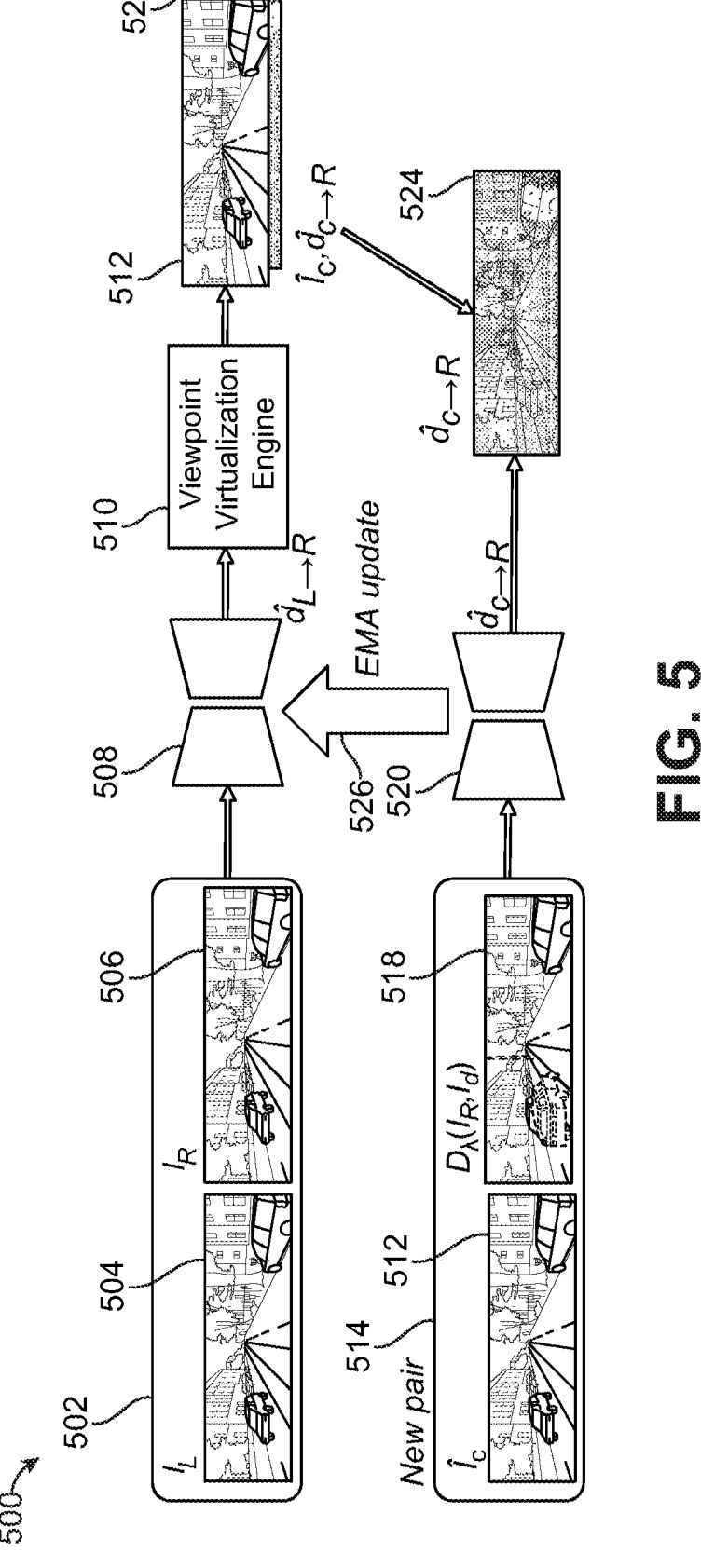
FIG. 5 is a block diagram illustrating an example of training a machine learning system for stereo depth adaptation, according to various aspects of the present disclosure.

Data from at least a portion of the source sensor suite 204 may be used to train machine-learning networks (e.g., the first machine learning network 508 of FIG. 5, the second machine learning network 520 of FIG. 5). For example, the sensor suite 204 can include multiple image sensors (e.g., the cameras 206) to generate stereo image pairs. In such an example, the distance between the image sensors used to generate the stereo image pairs can represent a baseline distance between the image sensors to be used to estimate depth of objects represented in the stereo image pairs. In further examples, the cameras 206 can generate the stereo image pair to be used to train a machine learning network.

FIG. 3 is a block diagram illustrating an example stereo image pair 302 and a disparity map 308. For example, the stereo image pair 302 includes a first image 304 and a second image 306. The first image 304 of the stereo image pair 302 can represent an image of a scene from a first viewpoint. The second image 306 of the stereo image pair 302 can represent an image of the scene represented in the first image 304 from a second viewpoint. For example, the first image 304 can represent a scene generated by a first image sensor from the first viewpoint and the second image 306 can represent the scene generated by a second image sensor from a different viewpoint from the first viewpoint (e.g., the second viewpoint).

The disparity map 308 can be an image representation of differences between the first image 304 and the second image 306 of the stereo image pair 302. In some examples, the disparity map 308 can represent pixel-wise differences in location of pixel values of images from the stereo image pair 302. The disparity map 308 can include depth information based on a magnitude of the shift between pixel values represented in the stereo image pair 302. For example, the distance at which the pixels are shifted (e.g., how many pixels over was a pixel value or features of the image represented by the pixel values shifted).

In some examples, a smaller disparity value (e.g., value representing a shift in pixel values) can indicate an object corresponding to the pixel values (e.g., an object represented in the stereo image pair 302) is closer than a larger disparity value. In some examples, the disparity map 308 can be determined based on matching features objects represented in the stereo image pair 302 and a determined shift between the matching features from a first image 304 to the second image 306.

In some examples, the disparity map 308 can be a matrix representation or array representation of the disparity values. In further examples, the disparity map 308 can be represented as a heat map image. For example, cooler colors (e.g., shades of blue and green) can represent lower disparity values (e.g., further distances or depths based on a low shift in pixel values), and warmer colors (e.g., shades of red, orange, and yellow) can represent higher disparity values (e.g., closer distances or depts based on a higher shift in pixel values).

FIG. 4 is a block diagram 400 illustrating an example of image sensor positioning for stereo vision and a virtual viewpoint to generate predicted images. FIG. 4 illustrates positioning image sensors for stereo vision, including a first image sensor 402 (e.g., a left camera) and a second image sensor 404 (e.g., a right camera). For example, the first image sensor 402 and the second image sensor 404 can be cameras of the sensor suite 204 of FIG. 2 on vehicle 202. In further examples, the first image sensor 402 and the second image sensor 404 can be image sensors of a smartphone, an XR device, a drone, a robot, or other device performing stereo vision.

The virtual viewpoint 406 represents an updated viewpoint position between the first image sensor 402 and the second image sensor 404 which can represent a viewpoint of predicted images generated by a machine learning network (e.g., the first machine learning network 508 or the second machine learning network 520 of FIG. 5). For example, the virtual viewpoint 406 can include an adjusted baseline distance representing the distance from the virtual viewpoint 406 to one of the image sensors. In such an example, the machine learning network generating images associated with the virtual viewpoint 406 can be trained to generate disparity maps associated with devices having different baseline distances between image sensors, thereby allowing the machine learning network to trained for and deployed for use in various devices having different baseline distances. The disparity maps can be used to perform various stereo vision tasks including depth and distance estimation of objects represented in stereo image pairs.

The depth and distance information can provide spatial measurements (e.g., positioning in a 3D space) of objects represented in images generated using the first image sensor 402 and the second image sensor 404 to generate 3D representations of a scene represented in the images. For example, the depth and distance information can be used to generate a point cloud representation of a scene represented in the images which can be used to generate 3D models of the scene. In such an example, the depth and distance information can be used to generate voxel representations of an environment, mesh representations of an environment, etc.

FIG. 5 is a block diagram 500 illustrating an example of training a machine learning system for stereo depth adaptation. FIG. 5 includes a first machine learning network 508 (e.g., a teacher machine learning network), a second machine learning network 520 (e.g., a student machine learning network), and a viewpoint virtualization engine 510. In some examples, the machine learning model can be a neural network such as the deep neural network 700 of FIG. 7, convolutional neural network (CNN) such as the CNN 800 of FIG. 8, transformer-based model, etc. In some examples, the first machine learning network 508 can be trained using unsupervised or semi-supervised training. For example, the first machine learning network 508 can be pretrained using ground-truth data associated with a source domain (e.g., for viewpoints having a baseline distance which the first machine learning network 508 is pretrained) and unlabeled data in a target domain (e.g., a desired baseline distance and virtual viewpoint to train the first machine learning network 508).

In some examples, the viewpoint virtualization engine 510 can be part of the first machine learning network 508. For example, the viewpoint virtualization engine 510 can be a module, component, block, etc. of the first machine learning network 508. In further examples, the viewpoint virtualization engine 510 can be an application, program, etc. separate from the first machine learning network 508.

The first machine learning network 508 can receive a stereo image pair 502, such as the stereo image pair 302 of FIG. 3. The stereo image pair 502 can include a first image 504 generated from a first viewpoint and a second image 506 generated from a second viewpoint. In some examples, the first image 504 and the second image 506 can be generated at substantially the same time and by different image sensors positioned at different viewpoints of a scene. The first machine learning network 508 can process the stereo image pair 502 to generate a disparity map associated with differences between the first image 504 and the second image 506 (e.g., differences or shifts in pixel values between images of a stereo image pair).

The disparity map can represent a shift in pixel values representing objects in the scene between the first image and the second image. In some examples, the disparity map can be represented as an image (such as a heat map image) or as an array disparity values. In such an example, the disparity values can represent a distance which pixel values (or features of an image represented by the pixel values) shifted between the first image 504 and the second image 506 of the stereo image pair 502. In some examples, the first machine learning network 508 can provide the disparity map to the viewpoint virtualization engine 510. In further examples, the viewpoint virtualization engine 510 can be part of the first machine learning network 508 (e.g., a module, component, block, layer, etc.).

The viewpoint virtualization engine 510 can generate a predicted image 512 and an updated disparity map 522. In some examples, such when the viewpoint virtualization engine 510 is part of the first machine learning network 508, the first machine learning network 508 can output the predicted image 512 and the updated disparity map 522. The predicted image 512 can be an image generated from a predetermined viewpoint (e.g., an image generated from a viewpoint associated with a target domain). For example, the first machine learning network 508 can be pretrained to generate disparity maps or images associated with predetermined baseline distance between the image sensors which generated the stereo image pair (e.g., the stereo image pair 502).

In such an example, the first machine learning network 508 can be pretrained on ground truth data associated with a source domain (e.g., the source domain can include intrinsics of the image sensors, such as a baseline distance between the image sensors, generating the stereo image pair). In some examples, the predetermined viewpoint is a viewpoint between the viewpoints of the image sensors which generated the stereo image pair 502.

In some examples, the first machine learning network can generate a disparity map and provide the disparity map to a viewpoint virtualization engine. The viewpoint virtualization engine can be an application, program, etc. to perform techniques such as depth rendering, image warping, or other viewpoint virtualization techniques to generate a predicted image from an updated viewpoint and a disparity map representing differences between the predicted image and an image of the stereo image pair 502.

In some examples, the viewpoint virtualization engine 510 can perform image warping techniques such as OCAI to generate the predicted image from a virtual viewpoint between the viewpoints of the image sensors which generated the stereo image pair. For example, the viewpoint virtualization engine 510 can receive the disparity map generated by the first machine learning network 508 (e.g., the disparity map based on a comparison of the first image 504 and the second image 506). The viewpoint virtualization engine 510 can generate two stereo depths such as ($d_{L \to R}$, $d_{R \to L}$) from the disparity map generated by the first machine learning network 508. In such an example, $d_{L \to R}$ can represent depth estimations when warping the stereo image pair 502 a first viewpoint (e.g., a viewpoint associated with a leftmost image sensor) to a second viewpoint (e.g., a viewpoint associated with a rightmost image sensor).

In further examples, the viewpoint virtualization engine 510 can apply a forward backward consistency-based occlusion mask (e.g., a mask representing positioning of occlusions which are consistent when performing backward and forward warping of the stereo image pair 502). The viewpoint virtualization engine 510 can fuse the images generated using forward warping and backward warping to generate the predicted image with a viewpoint in the target domain.

The viewpoint virtualization engine 510 can output the predicted image 512 and a disparity map 522 representing differences between the predicted image and an image of the stereo image pair 502. The second machine learning network 520 can receive a stereo image pair 514. The stereo image pair 514 can include the predicted image 512 and an image from the stereo image pair 502 with added noise (such as the second image 506 with added noise, referred to as noisy image 518). In some examples, the added noise can include another image added to portions of the image from the stereo image pair 502. For example, the systems and techniques can include fusing an additional image with the second image 506 (or the first image 504) to replace portions of the second image 506 with pixel values from the additional image. In further examples, the added noise of the noisy image 518 can be random noise, such as a random Gaussian noise distribution.

The second machine learning network 520 can process the predicted image 512 and the noisy image 518 to generate a disparity map 524 representing differences in pixel values between the predicted image 512 and the noisy image 518. The disparity map 522 and the disparity map 524 can be compared to determine a loss between the outputs of the first machine learning network 508 (with the viewpoint virtualization engine 510) and the second machine learning network 520. For example, the disparity map 522 can be used as a ground truth disparity map in determination of the loss.

Parameters (such as weights) of the first machine learning network 508 can be adjusted to reduce a loss function. For example, parameters of the first machine learning network 508 can be updated using an EMA update 526. In such an example, the EMA update 526 can be represented by the equation: $\theta_t' = \alpha\theta_{t-1}' + (1-\alpha)\theta_t$, where $\theta_t'$ is a teacher machine learning network weight (e.g., weights of the first machine learning network 508), $\theta_t$ is student machine learning network weight (e.g., weights of the second machine learning network 520), and $\alpha$ is a smoothing coefficient hyperparameter.

FIG. 6 is a flow chart illustrating an example of a process 600 for image processing, such as to perform stereo depth and disparity estimation. The process 600 can be performed by a computing device (e.g., the image capture and processing system 100 of FIG. 1, the image processor 150 of FIG. 1, computing device or computing system 900 of FIG. 9, etc.) or by a component or system (e.g., the first machine learning network 508 of FIG. 5, the second machine learning network 520 of FIG. 5, etc.),a chipset, one or more processors central processing units (CPUs), digital signal processors (DSPs), graphics processing units (GPUs), any other type of processor(s), any combination thereof, or other component or system) of the computing device. The operations of the process 600 can be implemented as software components that are executed and run on one or more processors (e.g., processor 910 of FIG. 9 or other processor(s)) of the computing device. Further, the transmission and reception of signals by the computing device in the process 600 can be enabled, for example, by one or more antennas, one or more microphones, and/or one or more transceivers (e.g., wireless transceiver(s)).

At block 602, the computing device (or component thereof) can process, using a first machine learning network, a first image of a scene from a first viewpoint and a second image of the scene from a second viewpoint to generate a predicted image of the scene from a predetermined viewpoint and a first disparity map associated with differences between the predicted image and the second image. For example, the first image can be generated using a first image sensor and the second image can be generated using a second image sensor. In further examples, the first image sensor and the second image sensor can be part of a stereo image sensor, such as the cameras of 206 of FIG. 2.

The first disparity map can refer to a representation of pixel-wise differences in location of pixel values of images from a stereo image pair (e.g., the first image and the second image). For example, the first image and the second image can be a stereo image pair. The disparity map can include depth information based on a magnitude of the shift between pixel values represented in the stereo image pair.

Figure 7:
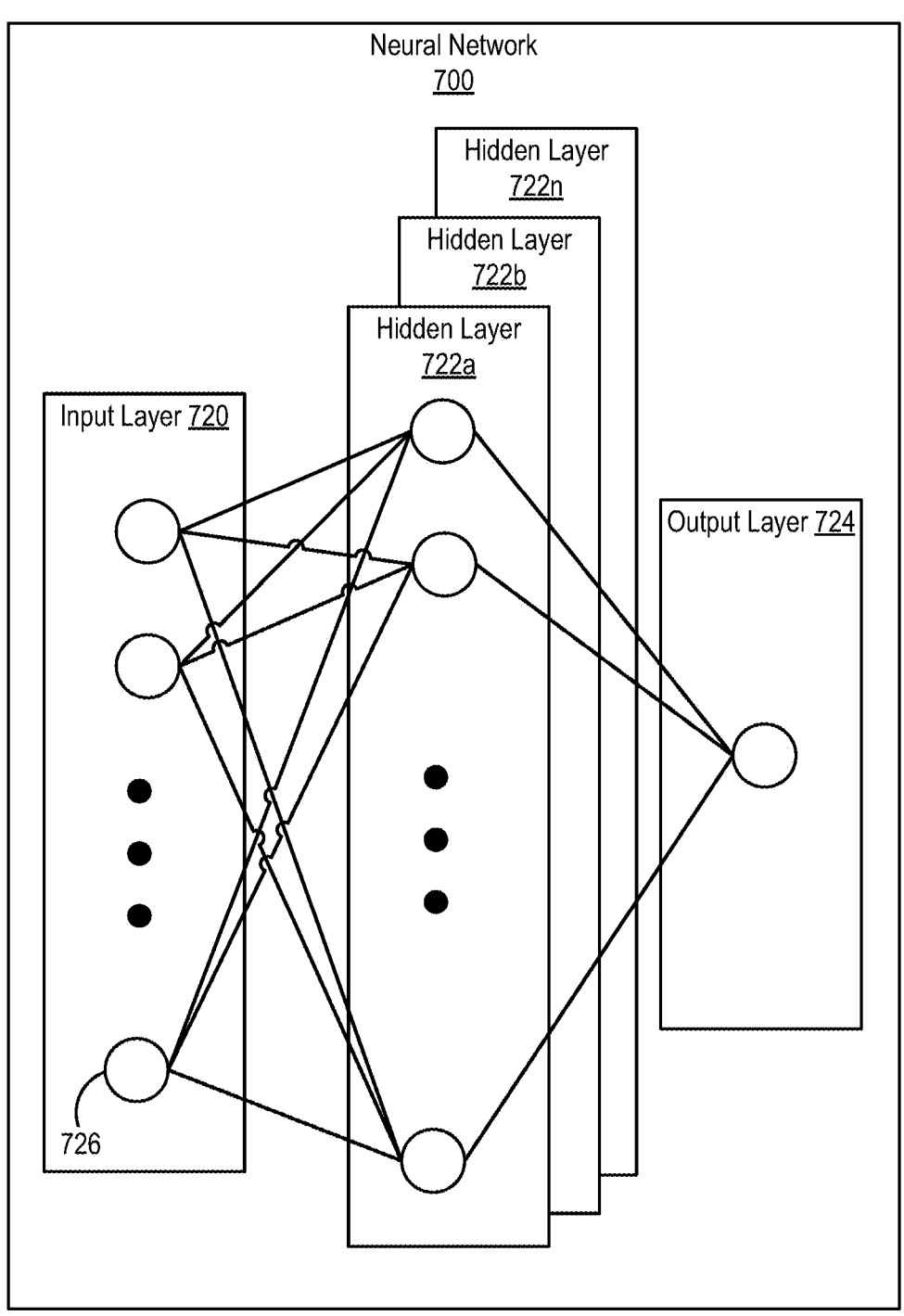
FIG. 7 is a block diagram illustrating an example deep convolutional network (DCN), in accordance with some examples of the present disclosure.
Figure 8:
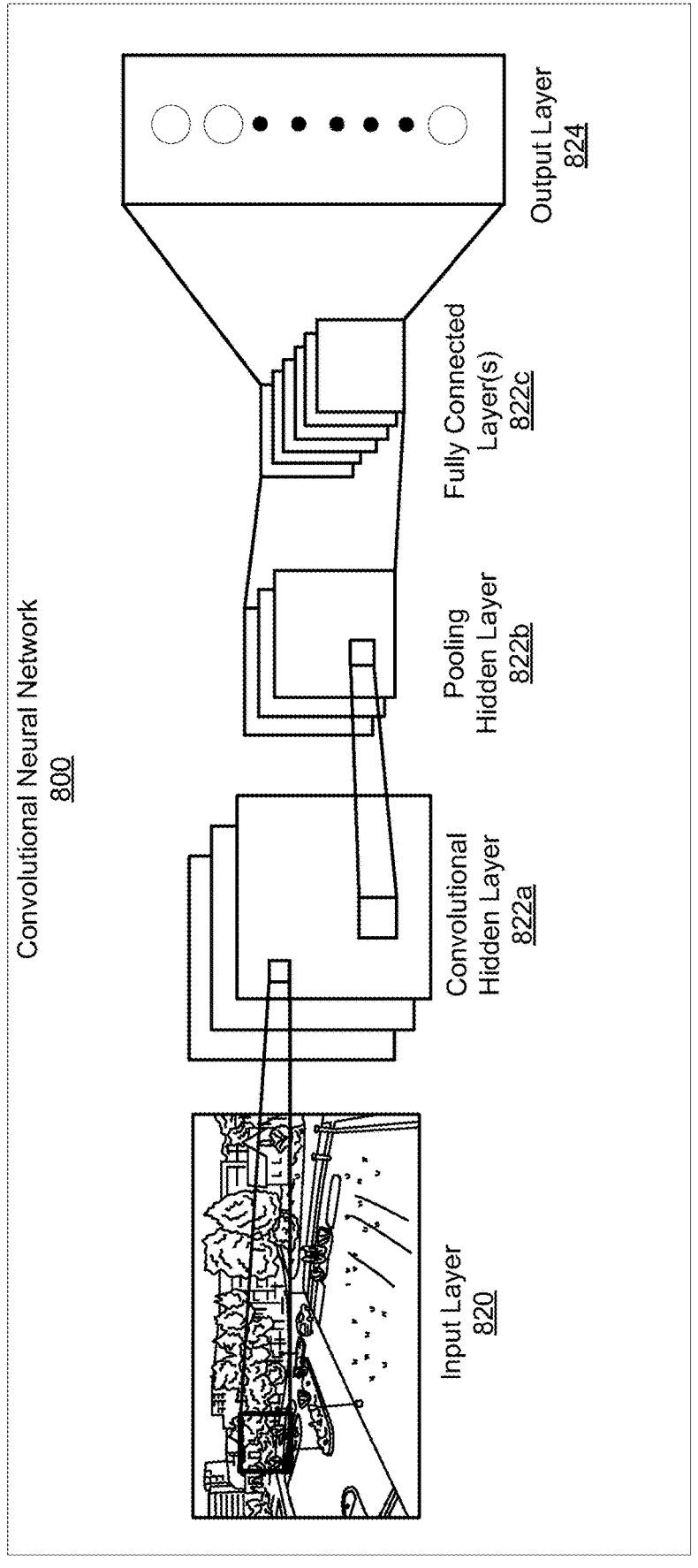
FIG. 8 is a block diagram illustrating an example deep convolutional network (DCN), in accordance with some examples of the present disclosure.

In some examples, the first machine learning network can be a neural network, convolutional neural network (CNN), a diffusion model, a transformer-based model, etc. such as the neural network 700 of FIG. 7, the CNN 800 of FIG. 8, etc. In some examples, the first machine learning network is trained to generate the predicted image of the scene from a predetermined viewpoint. In such an example, the predetermined viewpoint is a viewpoint of the scene between the first viewpoint and the second viewpoint. In further examples, the first viewpoint and the second viewpoint include a baseline distance representing a distance between a first image sensor used to generate images from the first viewpoint and a second image sensor used to generate images from the second viewpoint.

At block 604, the computing device (or component thereof) can process the predicted image and the second image including added noise using a second machine learning network to generate a second disparity map. In such an example, the second disparity map can be associated with differences between the second image with added noise and the predicted image. In some aspects, the added noise included in the second image can include an additional image replacing portions of the second image. For example, the computing device (or component thereof) can combine portions of the second image and the additional image.

At block 606, the computing device (or component thereof) can determine a loss associated with a comparison of the first disparity map and the second disparity map. For example, the first disparity map can represent a ground truth disparity map in determination of the loss. In some examples, various loss functions can be used to determine the loss such as a mean squared error (MSE) loss or a Huber loss.

At block 608, the computing device (or component thereof) can adjust parameters of the first machine learning network based on the loss. For example, the computing device (or component thereof) can include adjusting the parameters (e.g., adjusting weights) of the first machine learning network to reduce a loss function. In further examples, to adjust the parameters of the first machine learning network based on the loss using an exponential moving average (EMA) update. For example, the EMA update can be used to adjust the parameters with the first machine learning network as a teacher machine learning network and the second machine learning network as a student machine learning network.

In further examples, the computing device (or component thereof) can process a third image from the first viewpoint and a fourth image from the second viewpoint to generate a third disparity map using the first machine learning network with adjusted parameters. In further examples, the computing device (or component thereof) can determine a distance of an object (e.g., an object represented in the third image and the fourth image) from the apparatus or the first image sensor. For example, the determination can be based on the third disparity map and the baseline distance between the first image sensor and the second image sensor.

In some examples, the computing device (or component thereof) can adjust the predetermined viewpoint to determine an updated viewpoint. For example, the updated viewpoint can be a viewpoint between a viewpoint of the first image sensor or the second image sensor, and the predetermined viewpoint. In some examples, the computing device (or component thereof) can process a third image of an additional scene from the first viewpoint and a fourth image of the additional scene from the second viewpoint to generate a second predicted image from the updated viewpoint. In further examples, the computing device (or component thereof) can process the third image and the fourth image to generate an updated disparity map associated with differences between the second predicted image and the fourth image. In further examples, the third image and the fourth image can be processed using the first machine learning network.

In some examples, the computing device (or component thereof) can process the second predicted image and the fourth image including added noise to generate a third disparity map. In such an example, the third disparity map can be associated with differences in the fourth image including the added noise and the second predicted image. In further examples, the second predicted image and the fourth image can be processed using the second machine learning network. In some examples, the computing device (or component thereof) can determine a second loss associated with a comparison of the third disparity map and the updated disparity map. The computing device (or component thereof) can adjust the parameters of the first machine learning network based on the second loss. In further examples, the updated viewpoint can include an adjusted baseline distance between a first image sensor used to generate the third image and a second image sensor used to generate the fourth image.

As noted above, various aspects of the present disclosure can use machine learning models or systems. FIG. 7 is an illustrative example of a deep learning neural network 700 that can be used to implement the machine learning based feature extraction and/or activity recognition (or classification) described above. An input layer 720 includes input data. In one illustrative example, the input layer 720 can include data representing the pixels of an input video frame. The neural network 700 includes multiple hidden layers 722a, 722b, through 722n. The hidden layers 722a, 722b, through 722n include "n" number of hidden layers, where "n" is an integer greater than or equal to one. The number of hidden layers can be made to include as many layers as needed for the given application. The neural network 700 further includes an output layer 724 that provides an output resulting from the processing performed by the hidden layers 722a, 722b, through 722n.

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the first hidden layer 722a can transform the information of each input node by applying activation functions to the input node information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 724, at which an output is provided. In some cases, while nodes (e.g., node 726) in the neural network 700 are shown as having multiple output lines, a node has a single output and all lines shown as being output from a node represent the same output value.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the first hidden layer 722a can transform the information of each input node by applying activation functions to the input node information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 724, at which an output is provided. In some cases, while nodes (e.g., node 726) in the neural network 700 are shown as having multiple output lines, a node has a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 724. In an example in which the neural network 700 is used to reduce wind noise in an audio signal, the neural network 700 can be trained using training data generated in the process described in FIG. 6.

In some cases, the neural network 700 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 700 is trained well enough so that the weights of the layers are accurately tuned.

For the example of reducing noise in audio signals, the forward pass can include passing training data through the neural network 700. The weights are initially randomized before the neural network 700 is trained. As an illustrative example, an audio signal can include an array of numbers representing a sequence of sounds. Each number in the array can include a numerical value representing sounds in sequence. In one example, the array is a one-dimensional sequence of numbers.

As noted above, for a first training iteration for the neural network 700, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 700 is unable to determine low level features and thus cannot make an accurate determination of what the classification of the object might be. A loss function can be used to analyze error in the output. Any suitable loss function definition can be used, such as the loss function described in the description of FIG. 5. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training data since the actual values will be much different than the predicted output. The goal of training is to minimize the amount of loss so that the predicted output is the same as the training label. The neural network 700 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and n denotes a learning rate. The learning rate can be set to any suitable value, with a high learning rate including larger weight updates and a lower value indicating smaller weight updates.

The neural network 700 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 700 can include any other deep network other than a CNN, such as an autoencoder, a deep belief nets (DBNs), a Recurrent Neural Networks (RNNs), among others.

FIG. 8 is an illustrative example of a convolutional neural network (CNN) 800. FIG. 8 provides an example for operation of a convolutional neural network (CNN) 800 on images and video, however the structure of the convolutional neural network (CNN) may be further adapted to receive one-dimensional inputs such as audio signals. The input layer 820 of the CNN 800 includes data representing an image or frame. For example, the data can include an array of numbers representing the pixels of the image, with each number in the array including a value from 0 to 255 describing the pixel intensity at that position in the array. For example, the array can include a 28×28×3 array of numbers with 28 rows and 28 columns of pixels and 3 color components (e.g., red, green, and blue, or luma and two chroma components, or the like). The image can be passed through a convolutional hidden layer 822a, an optional non-linear activation layer, a pooling hidden layer 822b, and fully connected hidden layers 822c to get an output at the output layer 824. While only one of each hidden layer is shown in FIG. 8, one of ordinary skill will appreciate that multiple convolutional hidden layers, non-linear layers, pooling hidden layers, and/or fully connected layers can be included in the CNN 800. The output can indicate a single class of an object or can include a probability of classes that best describe the object in the image.

The first layer of the CNN 800 is the convolutional hidden layer 822a. The convolutional hidden layer 822a analyzes the image data of the input layer 820. Each node of the convolutional hidden layer 822a is connected to a region of nodes (pixels) of the input image called a receptive field. The convolutional hidden layer 822a can be considered as one or more filters (each filter corresponding to a different activation or feature map), with each convolutional iteration of a filter being a node or neuron of the convolutional hidden layer 822a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 822a. Each connection between a node and a receptive field for that node learns a weight and, in some cases, an overall bias such that each node learns to analyze its particular local receptive field in the input image. Each node of the hidden layer 822a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 822a is due to each node of the convolutional layer being applied to its corresponding receptive field. For example, a filter of the convolutional hidden layer 822a can begin in the top-left corner of the input image array and can convolve around the input image. As noted above, each convolutional iteration of the filter can be considered a node or neuron of the convolutional hidden layer 822a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 822a. For example, a filter can be moved by a step amount (referred to as a stride) to the next receptive field. The stride can be set to 1 or another suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 822a.

The mapping from the input layer to the convolutional hidden layer 822a is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 822a can include several activation maps in order to identify multiple features in an image. The example shown in FIG. 8 includes three activation maps. Using three activation maps, the convolutional hidden layer 822a can detect three different kinds of features, with each feature being detectable across the entire image.

In some examples, a non-linear hidden layer can be applied after the convolutional hidden layer 822a. The non-linear layer can be used to introduce non-linearity to a system that has been computing linear operations. One illustrative example of a non-linear layer is a rectified linear unit (ReLU) layer. A ReLU layer can apply the function $f(x)=max(0, x)$ to all of the values in the input volume, which changes all the negative activations to 0. The ReLU can thus increase the non-linear properties of the CNN 800 without affecting the receptive fields of the convolutional hidden layer 822a.

The pooling hidden layer 822b can be applied after the convolutional hidden layer 822a (and after the non-linear hidden layer when used). The pooling hidden layer 822b is used to simplify the information in the output from the convolutional hidden layer 822a. For example, the pooling hidden layer 822b can take each activation map output from the convolutional hidden layer 822a and generates a condensed activation map (or feature map) using a pooling function. Max-pooling is one example of a function performed by a pooling hidden layer. Other forms of pooling functions be used by the pooling hidden layer 822a, such as average pooling, L2-norm pooling, or other suitable pooling functions. A pooling function (e.g., a max-pooling filter, an L2-norm filter, or other suitable pooling filter) is applied to each activation map included in the convolutional hidden layer 822a. In the example shown in FIG. 8, three pooling filters are used for the three activation maps in the convolutional hidden layer 822a.

In some examples, max-pooling can be used by applying a max-pooling filter (e.g., having a size of 2×2) with a stride (e.g., equal to a dimension of the filter, such as a stride of 2) to an activation map output from the convolutional hidden layer 822a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 822a having a dimension of 24×24 nodes, the output from the pooling hidden layer 822b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

Intuitively, the pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 800.

The final layer of connections in the network is a fully connected layer 822c that connects every node from the pooling hidden layer 822b to every one of the output nodes in the output layer 824. Using the example above, the input layer includes 28×28 nodes encoding the pixel intensities of the input image, the convolutional hidden layer 822a includes 3×24×24 hidden feature nodes based on application of a 5×5 local receptive field (for the filters) to three activation maps, and the pooling hidden layer 822b includes a layer of 3×12×12 hidden feature nodes based on application of max-pooling filter to 2×2 regions across each of the three feature maps. Extending this example, the output layer 824 can include ten output nodes. In such an example, every node of the 3×12×12 pooling hidden layer 822b is connected to every node of the output layer 824.

The fully connected layer 822c can obtain the output of the previous pooling hidden layer 822b (which should represent the activation maps of high-level features) and determines the features that most correlate to a particular class. For example, the fully connected layer 822c layer can determine the high-level features that most strongly correlate to a particular class and can include weights (nodes) for the high-level features. A product can be computed between the weights of the fully connected layer 822c and the pooling hidden layer 822b to obtain probabilities for the different classes. For example, if the CNN 800 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 824 can include an M-dimensional vector (in the prior example, M=10). M indicates the number of classes that the CNN 800 can choose from when classifying the object in the image.

Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some aspects, computing system 900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some aspects, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, an engine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1. An apparatus for image processing, the apparatus comprising: at least one memory; and at least one processor coupled to the at least one memory and configured to: process, using a first machine learning network, a first image of a scene from a first viewpoint and a second image of the scene from a second viewpoint to generate a predicted image of the scene from a predetermined viewpoint and a first disparity map associated with differences between the predicted image and the second image; process, using a second machine learning network, the predicted image and the second image including added noise to generate a second disparity map, wherein the second disparity map is associated with differences between the second image with added noise and the predicted image; determine a loss associated with a comparison of the first disparity map and the second disparity map; and adjust parameters of the first machine learning network based on the loss.

Aspect 2. The apparatus of Aspect 1, wherein the added noise included in the second image includes an additional image replacing portions of the second image.

Aspect 3. The apparatus of any of Aspects 1 to 2, wherein the first image and the second image are a stereo image pair generated by a first image sensor and a second image sensor.

Aspect 4. The apparatus of any of Aspects 1 to 3, wherein the at least one processor is configured to adjust the parameters of the first machine learning network based on the loss by: using an exponential moving average (EMA) update to adjust the parameters, wherein the first machine learning network is a teacher machine learning network and the second machine learning network is a student machine learning network.

Aspect 5. The apparatus of any of Aspects 1 to 4, wherein the predetermined viewpoint is a viewpoint of the scene between the first viewpoint and the second viewpoint.

Aspect 6. The apparatus of any of Aspects 1 to 5, wherein the first disparity map represents a ground truth disparity map in determination of the loss.

Aspect 7. The apparatus of any of Aspects 1 to 6, wherein the first viewpoint and the second viewpoint include a baseline distance representing a distance between a first image sensor used to generate images from the first viewpoint and a second image sensor used to generate images from the second viewpoint.

Aspect 8. The apparatus of any of Aspects 1 to 7, wherein the at least one processor is configured to: process, using the first machine learning network with adjusted parameters, a third image from the first viewpoint and a fourth image from the second viewpoint to generate a third disparity map; and determine, based on the third disparity map and the baseline distance between the first image sensor and the second image sensor, a distance of an object from the apparatus or the first image sensor, wherein the object is represented in the third image and the fourth image.

Aspect 9. The apparatus of any of Aspects 1 to 8, wherein the at least one processor is configured to: adjust the predetermined viewpoint to determine an updated viewpoint; process, using the first machine learning network, a third image of an additional scene from the first viewpoint and a fourth image of the additional scene from the second viewpoint to generate a second predicted image from the updated viewpoint and an updated disparity map associated with differences between the second predicted image and the fourth image; process, using the second machine learning network, the second predicted image and the fourth image including added noise to generate a third disparity map, wherein the third disparity map is associated with differences in the fourth image including the added noise and the second predicted image; determine a second loss associated with a comparison of the third disparity map and the updated disparity map; and adjust the parameters of the first machine learning network based on the second loss.

Aspect 10. The apparatus of any of Aspects 1 to 9, wherein the updated viewpoint includes an adjusted baseline distance between a first image sensor used to generate the third image and a second image sensor used to generate the fourth image.

Aspect 11. A method for image processing, the method comprising: processing, using a first machine learning network, a first image of a scene from a first viewpoint and a second image of the scene from a second viewpoint to generate a predicted image of the scene from a predetermined viewpoint and a first disparity map associated with differences between the predicted image and the second image; processing, using a second machine learning network, the predicted image and the second image including added noise to generate a second disparity map, wherein the second disparity map is associated with differences between the second image with added noise and the predicted image; determining a loss associated with a comparison of the first disparity map and the second disparity map; and adjusting parameters of the first machine learning network based on the loss.

Aspect 12. The method of Aspect 11, wherein the added noise included in the second image includes an additional image replacing portions of the second image.

Aspect 13. The method of any of Aspects 11 to 12, wherein the first image and the second image are a stereo image pair generated by a first image sensor and a second image sensor.

Aspect 14. The method of any of Aspects 11 to 13, wherein adjusting the parameters of the first machine learning network based on the loss by: using an exponential moving average (EMA) update to adjust the parameters, wherein the first machine learning network is a teacher machine learning network and the second machine learning network is a student machine learning network.

Aspect 15. The method of any of Aspects 11 to 14, wherein the predetermined viewpoint is a viewpoint of the scene between the first viewpoint and the second viewpoint.

Aspect 16. The method of any of Aspects 11 to 15, wherein the first disparity map represents a ground truth disparity map in determination of the loss.

Aspect 17. The method of any of Aspects 11 to 16, wherein the first viewpoint and the second viewpoint include a baseline distance representing a distance between a first image sensor used to generate images from the first viewpoint and a second image sensor used to generate images from the second viewpoint.

Aspect 18. The method of any of Aspects 11 to 17, further comprising: processing, using the first machine learning network with adjusted parameters, a third image from the first viewpoint and a fourth image from the second viewpoint to generate a third disparity map; and determining, based on the third disparity map and the baseline distance between the first image sensor and the second image sensor, a distance of an object from the method or the first image sensor, wherein the object is represented in the third image and the fourth image.

Aspect 19. The method of any of Aspects 11 to 18, further comprising: adjusting the predetermined viewpoint to determine an updated viewpoint; processing, using the first machine learning network, a third image of an additional scene from the first viewpoint and a fourth image of the additional scene from the second viewpoint to generate a second predicted image from the updated viewpoint and an updated disparity map associated with differences between the second predicted image and the fourth image; processing, using the second machine learning network, the second predicted image and the fourth image including added noise to generate a third disparity map, wherein the third disparity map is associated with differences in the fourth image including the added noise and the second predicted image; determining a second loss associated with a comparison of the third disparity map and the updated disparity map; and adjusting the parameters of the first machine learning network based on the second loss.

Aspect 20. The method of any of Aspects 11 to 19, wherein the updated viewpoint includes an adjusted baseline distance between a first image sensor used to generate the third image and a second image sensor used to generate the fourth image.

Aspect 21. A non-transitory computer-readable medium having stored thereon instructions that, when executed by at least one processor, cause the at least one processor to perform one or more of operations according to any of Aspects 11 to 20.

Aspect 22. An apparatus for image processing comprising one or more means for performing operations according to any of Aspects 11 to 20.

What is claimed is:

1. An apparatus for image processing, the apparatus comprising:
at least one memory; and
at least one processor coupled to the at least one memory and configured to:
process, using a first machine learning network, a first image of a scene from a first viewpoint and a second image of the scene from a second viewpoint to generate a predicted image of the scene from a predetermined viewpoint and a first disparity map associated with differences between the predicted image and the second image;
process, using a second machine learning network, the predicted image and the second image including added noise to generate a second disparity map, wherein the second disparity map is associated with differences between the second image with added noise and the predicted image;

determine a loss associated with a comparison of the first disparity map and the second disparity map; and adjust parameters of the first machine learning network based on the loss.

2. The apparatus of claim 1, wherein the added noise included in the second image includes an additional image replacing portions of the second image.

3. The apparatus of claim 1, wherein the first image and the second image are a stereo image pair generated by a first image sensor and a second image sensor.

4. The apparatus of claim 1, wherein the at least one processor is configured to adjust the parameters of the first machine learning network based on the loss by:

using an exponential moving average (EMA) update to adjust the parameters, wherein the first machine learning network is a teacher machine learning network and the second machine learning network is a student machine learning network.

5. The apparatus of claim 1, wherein the predetermined viewpoint is a viewpoint of the scene between the first viewpoint and the second viewpoint.

6. The apparatus of claim 1, wherein the first disparity map represents a ground truth disparity map in determination of the loss.

7. The apparatus of claim 1, wherein the first viewpoint and the second viewpoint include a baseline distance representing a distance between a first image sensor used to generate images from the first viewpoint and a second image sensor used to generate images from the second viewpoint.

8. The apparatus of claim 7, wherein the at least one processor is configured to:

process, using the first machine learning network with adjusted parameters, a third image from the first viewpoint and a fourth image from the second viewpoint to generate a third disparity map; and determine, based on the third disparity map and the baseline distance between the first image sensor and the second image sensor, a distance of an object from the apparatus or the first image sensor, wherein the object is represented in the third image and the fourth image.

9. The apparatus of claim 1, wherein the at least one processor is configured to:

adjust the predetermined viewpoint to determine an updated viewpoint;

process, using the first machine learning network, a third image of an additional scene from the first viewpoint and a fourth image of the additional scene from the second viewpoint to generate a second predicted image from the updated viewpoint and an updated disparity map associated with differences between the second predicted image and the fourth image;

process, using the second machine learning network, the second predicted image and the fourth image including added noise to generate a third disparity map, wherein the third disparity map is associated with differences in the fourth image including the added noise and the second predicted image;

determine a second loss associated with a comparison of the third disparity map and the updated disparity map; and adjust the parameters of the first machine learning network based on the second loss.

10. The apparatus of claim 9, wherein the updated viewpoint includes an adjusted baseline distance between a first image sensor used to generate the third image and a second image sensor used to generate the fourth image.

11. A method for image processing, the method comprising:

processing, using a first machine learning network, a first image of a scene from a first viewpoint and a second image of the scene from a second viewpoint to generate a predicted image of the scene from a predetermined viewpoint and a first disparity map associated with differences between the predicted image and the second image;

processing, using a second machine learning network, the predicted image and the second image including added noise to generate a second disparity map, wherein the second disparity map is associated with differences between the second image with added noise and the predicted image;

determining a loss associated with a comparison of the first disparity map and the second disparity map; and adjusting parameters of the first machine learning network based on the loss.

12. The method of claim 11, wherein the added noise included in the second image includes an additional image replacing portions of the second image.

13. The method of claim 11, wherein the first image and the second image are a stereo image pair generated by a first image sensor and a second image sensor.

14. The method of claim 11, wherein adjusting the parameters of the first machine learning network based on the loss by:

using an exponential moving average (EMA) update to adjust the parameters, wherein the first machine learning network is a teacher machine learning network and the second machine learning network is a student machine learning network.

15. The method of claim 11, wherein the predetermined viewpoint is a viewpoint of the scene between the first viewpoint and the second viewpoint.

16. The method of claim 11, wherein the first disparity map represents a ground truth disparity map in determination of the loss.

17. The method of claim 11, wherein the first viewpoint and the second viewpoint include a baseline distance representing a distance between a first image sensor used to generate images from the first viewpoint and a second image sensor used to generate images from the second viewpoint.

18. The method of claim 17, further comprising:

processing, using the first machine learning network with adjusted parameters, a third image from the first viewpoint and a fourth image from the second viewpoint to generate a third disparity map; and determining, based on the third disparity map and the baseline distance between the first image sensor and the second image sensor, a distance of an object from the method or the first image sensor, wherein the object is represented in the third image and the fourth image.

19. The method of claim 11, further comprising:

adjusting the predetermined viewpoint to determine an updated viewpoint;

processing, using the first machine learning network, a third image of an additional scene from the first viewpoint and a fourth image of the additional scene from the second viewpoint to generate a second predicted image from the updated viewpoint and an updated disparity map associated with differences between the second predicted image and the fourth image;

processing, using the second machine learning network, the second predicted image and the fourth image including added noise to generate a third disparity map, wherein the third disparity map is associated with differences in the fourth image including the added noise and the second predicted image;

determining a second loss associated with a comparison of the third disparity map and the updated disparity map; and adjusting the parameters of the first machine learning network based on the second loss.

20. A non-transitory computer-readable medium having stored thereon instructions that, when executed by at least one processor, cause the at least one processor to:

process, using a first machine learning network, a first image of a scene from a first viewpoint and a second image of the scene from a second viewpoint to generate a predicted image of the scene from a predetermined viewpoint and a first disparity map associated with differences between the predicted image and the second image;

process, using a second machine learning network, the predicted image and the second image including added noise to generate a second disparity map, wherein the second disparity map is associated with differences between the second image with added noise and the predicted image;

determine a loss associated with a comparison of the first disparity map and the second disparity map; and adjust parameters of the first machine learning network based on the loss.

* * * * *